Figure 1:
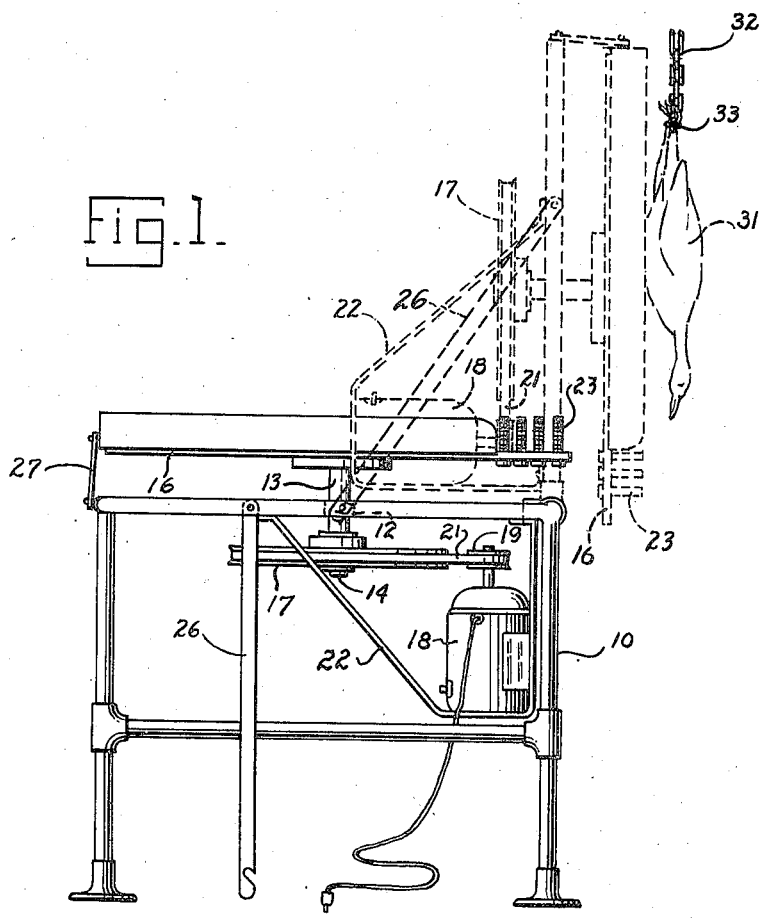

July 6, 1948.   H. E. DREWS   2,444,556
MEANS FOR PLUCKING POULTRY
Filed Aug. 2, 1943   2 Sheets-Sheet 1

INVENTOR.
Harry E. Drews
BY
Flournoy Corey

July 6, 1948. H. E. DREWS 2,444,556
MEANS FOR PLUCKING POULTRY
Filed Aug. 2, 1943 2 Sheets-Sheet 2

INVENTOR.
Harry E. Drews
BY
Flournoy Corey.

Patented July 6, 1948

2,444,556

UNITED STATES PATENT OFFICE 2,444,556

MEANS FOR PLUCKING POULTRY

Harry E. Drews, Ottumwa, Iowa, assignor of one-half to Flournoy Corey, Cedar Rapids, Iowa Application August 2, 1943, Serial No. 497,011

6 Claims. (Cl. 17—11.1)

This invention relates to processing of poultry and has particular relation to an improved means for de-feathering poultry.

In the commonly known poultry picking machines, the rate of travel of the feather removing means is substantially constant—that is, at a given motor speed and drive and driven pulley, the drum speed will always be the same, and therefore the operator cannot change the peripheral speed at which the fingers strike the poultry. I have discovered, however, that it is very desirable not only to provide different speeds or rate of movements for the fingers for a poultry plucker for different birds and for different parts of the same bird, but to provide also for different directions of movement of the fingers over the body of the bird, and also that a circular or wiping movement of the fingers is preferable to a circular movement tangent to the point of application of the fingers.

For instance, rough strong fingers and high speeds may be employed for heavy birds, while slower speeds and lighter fingers should be employed for broilers, or with a given fowl or with an individual bird the backs may be picked at a higher speed than the breasts. Furthermore I have discovered that direction of movement of the fingers with regard to the feathers may be changed on different parts of a bird, or with different birds, to a marked advantage.

Furthermore, in some plants conveyors are utilized with the birds hung from shackles during the plucking operation, in which case a movement of the plucking fingers in a vertical plane is desirable, while in other operations the bird is supported by hand and movement of the plucking fingers in a horizontal plane is desirable.

It is therefore one of the main objects of my invention to provide a means of plucking poultry which permits the plucking operation to be carried on readily at different speeds without any change or adjustment of the machine.

Another object of my invention is to provide means for varying the direction of application of the fingers to the bird without change or adjustment of the machine.

Another object of my invention is to provide a poultry picking machine which may be readily adapted for use in both a horizontal and a vertical plane.

Still another object of my invention is to provide an extremely simple machine in which only relatively few fingers are employed and in which a minimum number of fingers and finger mounting surface is employed in proportion to the number of fingers effective against the bird during the plucking operation.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 2:
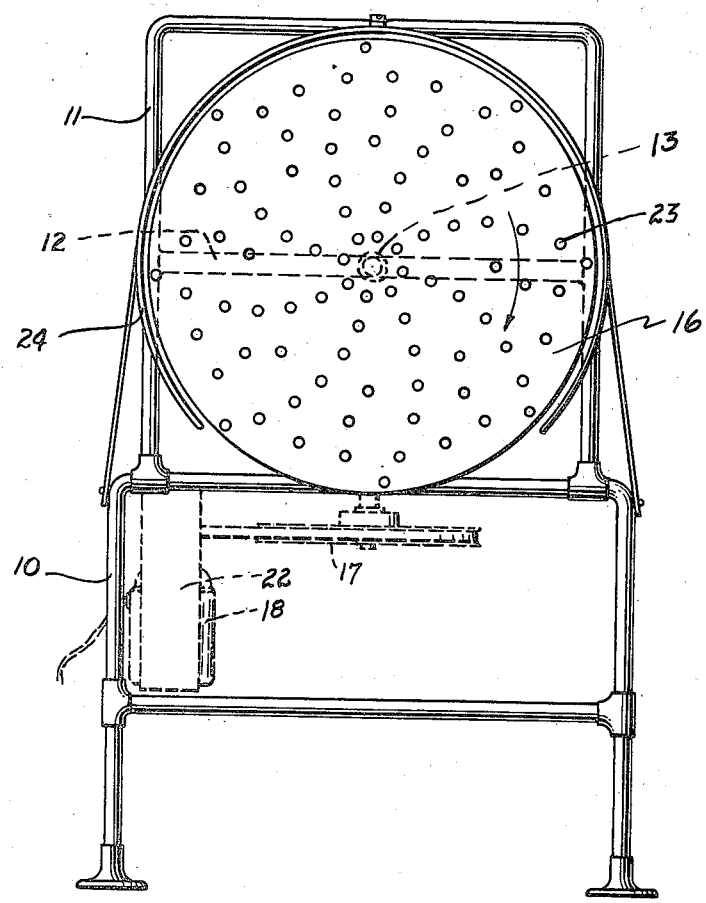

In said drawings:

Figure 1 is a view in side elevation of a machine constructed according to one embodiment of my invention, and Figure 2 is a view in front elevation of the machine shown in Figure 1.

Referring then to the drawings:

I may employ any suitable base, as for instance the open frame base illustrated at 10 and having a movable motor and disc supporting frame, such as the U-shaped frame 11. The picker frame 11 carries a cross member 12 in which a long bearing 13 is mounted. A shaft 14 passes through the bearing 13 and a picker disc 16 is secured to one end of the shaft. A large pulley 17 is secured to the other end of the shaft and a motor or other power source 18 drives the large pulley through the drive pulley 19 and the belt 21. The motor 18 is supported in any suitable supporting member, as the bracket 22 which is in turn secured to the frame 11.

The disc 16 is provided with a plurality of picker fingers 23 which project at right angles from the disc. The fingers may be of rubber or other resilient material arranged in any suitable manner, as for instance the helical arrangement shown. A guard 24 is provided and supported from the U-shaped frame 11 by means such as link 27 and this guard may be in the form of a portion of a cylinder open at the bottom so that the feathers may be discharged at the bottom of the disc and so that they will not be readily thrown out of other portions of the disc.

The frame 11 is pivotally mounted on the base 10 so that it may be supported in upright position by means of the link 26 and as indicated in dotted lines in Figure 1, or the disc and driving mechanism may be dropped downwardly to the horizontal position where the frame 11 and attached mechanism is supported by the rear legs of the base 10.

When the disc is mounted in the vertical plane, as illustrated in Figure 2 or as shown in dotted lines Figure 1, the bird 31 may be supported by hand or preferably supported by means of a chain 32 and shackle 33, and the operator may readily press the bird against the ends of the fingers for removing the feathers.

Now it is quite apparent that as the bird is moved outwardly toward the rim of the picker disc, the speed of movement of the fingers becomes greater. If the disc rotates in clockwise direction, for instance, and the bird is hanging from a shackle and it is desirable to pluck the feathers "against the grain," the bird would be pushed to the right of the center of rotation of the disc. If the back of the bird were being plucked, the operator might choose to apply the bird to the periphery of the disc, while if he is plucking the feathers from the breast of the bird where the skin is tender, he would move the bird closer to the center of the disc. In fact, he might apply the bird directly over the center of the disc to secure a rotary movement of the fingers against the bird, or he might apply the bird to the left of the center of the wheel 16 to cause the feathers to move "with the grain." If we wish to cause the fingers to rub the bird "across the grain," it would only be necessary to pull down on the bird so that it would be below the center of the disc.

All these variations may, of course, be obtained without changing the relative direction of the body of the fowl without removing it from the suspending attachment, such as the shackle, and without adjustment of the machine.

The shackle and overhead suspension of the bird is ordinarily employed in connection with conveyor systems, but a considerable proportion of poultry plucking is done merely by hand manipulation of the bird. In this case it is preferable that the surface of the plucker disc or the plane of rotation of the fingers be in a horizontal plane. This, of course, can be readily done by dropping the entire frame 11 and the disc to the horizontal plane shown in Figure 1. In this position the weight of the bird is utilized to hold it against the fingers and it is only necessary for the operator to hold onto the feet and neck of the bird to carry out the plucking operation.

It is quite apparent that a larger number of fingers are presented to the bird with the disc structure, here shown, than with the drums commonly known to the art. The structure is simpler than the drum type. Because of the nature of the plucking members and their supporting surface, the ratio of effective picking surface is higher than in machines commonly used and thus the weight of the machine and the cost of construction is less for a given effective area of plucking surface. The outer edge of the disc obviously moves more rapidly and hence the operator may apply the bird to fingers which move at varying rates of speed merely by movement of the bird over the disc.

The feathers at the breast may be removed easily with the fingers moving against the "lay" of the feathers, while other portions of the bird, or other birds, such as "pinny broilers" may be so presented to the disc that the feathers are removed by an action of the fingers against the "lay" of the feathers. Or, if desired, a cross action or diagonal action is available on the plucking surface of the machine for use on the portions of the body of the fowl where feathers may be most efficiently removed by such direction of picking action. All these variations may be obtained without changing the relative direction of the body of the fowl and without removing it from the shackle or other suspending attachment.

The structure here disclosed is such that it may be readily adapted to various existing mounts or drives; as for example, a small disc having a few light, soft fingers may be manufactured and sold to be attached on the shaft and drive used for grinding wheels, for use in small volume or household operations in plucking poultry. A larger disc may be supplied for attachment on tractor and motor driven mandrels for use in seasonal processing of poultry.

Although I have described a specific embodiment of my invention, it is apparent that modifications thereof may be made by those skilled in the art. Such modifications may be made without departing from the spirit and scope of my invention as set forth in the appended claims.

I claim as my invention:

1. A poultry picking machine comprising a main frame, a swingable frame pivotally connected with said main frame and shiftable generally from a horizontal position to a vertical position, a rotatable disk carried by said swingable frame and swingable therewith, a plurality of resilient plucking fingers extending outwardly from the face of said disk, and means for driving said disk in either position of said swingable frame.

2. A poultry picking machine comprising a main frame, a swingable frame pivotally connected at one side with one side of said main frame and shiftable generally from a horizontal position to a vertical position, a rotatable disk carried by said swingable frame and disposed generally horizontal when the swingable frame is horizontal and generally vertical when said swingable frame is vertical, resilient plucking fingers carried by said disk, and a guard about said disk having an open section operative in either position of said disk and swingable frame to discharge the plucked feathers therethrough.

3. In a poultry picking mechanism, a rotatable disk disposed generally in a vertical position, resilient fingers on said disk projecting axially therefrom, means for driving said disk, and movable flexible means for suspending or supporting a fowl directly in front of said disk to provide for shifting said fowl into a position to be engaged by said fingers by moving said fowl generally directly axially toward said disk.

4. In a poultry picking mechanism, a rotatable disk disposed generally in a vertical position, resilient fingers on said disk projecting axially therefrom, means for driving said disk, and movable flexible supporting means for supporting said fowl directly in front of said disk and providing for movement of said fowl substantially directly into said disk and also laterally and vertically relative thereto so as to have said fingers engage the fowl from different directions.

5. The combination with a conveyor for poultry being dressed, of a disk-like member disposed in a substantially vertical plane, means for supporting and means for rotating said member disposed generally behind said disk-like member, and a plurality of resilient cleaning fingers projecting from the front face of the disk-like member, the relative positions of the disk-like member and conveyor being such that poultry will be carried by the conveyor past the front face and approximately level with the axis of rotation of the disk-like member whereby poultry, so conveyed, may be subjected, at the will of the operator, to the action of fingers near the axis of the said disk-like member or near the upwardly or near the downwardly moving edges thereof to thus govern the speed and direction of movement of the fingers relative to the poultry being dressed.

6. A poultry picking machine comprising a main frame, a swingable frame pivotally connected with said main frame and shiftable generally from a horizontal position to a vertical position, a rotatable disk carried by said swingable frame and swingable therewith, a plurality of resilient plucking fingers extending outwardly from the face of said disk, means for driving said disk in either position of said swingable frame, and means for supporting said swingable frame in either position, comprising a link connected between said frames and dis-engageable from one of said frames.

HARRY E. DREWS.

REFERENCES CITED

The following references are of record in the file of this patent:

UNITED STATES PATENTS

| Number | Name | Date |
| --- | --- | --- |
| 589,006 | Manning | Aug. 31, 1897 |
| 994,216 | Thompson | June 6, 1911 |
| 1,673,094 | Stack | June 12, 1928 |
| 1,889,228 | Swanson | Nov. 29, 1932 |
| 1,953,983 | Benner | Apr. 10, 1934 |
| 2,007,949 | Lauretti | July 9, 1935 |
| 2,268,581 | Fisher | Jan. 6, 1942 |
| 2,280,498 | Morris | Apr. 21, 1942 |
| 2,286,650 | Sandlin | June 16, 1942 |
| 2,328,770 | Barker | Sept. 7, 1943 |
| 2,337,201 | Johnson | Dec. 21, 1943 |